F. H. HALSTEAD.
LATHE TOOL.
APPLICATION FILED APR. 7, 1919.

1,342,746.

Patented June 8, 1920.
3 SHEETS—SHEET 1.

Inventor:
Frederick H. Halstead.
by Emery Booth Janney Varney
Attys.

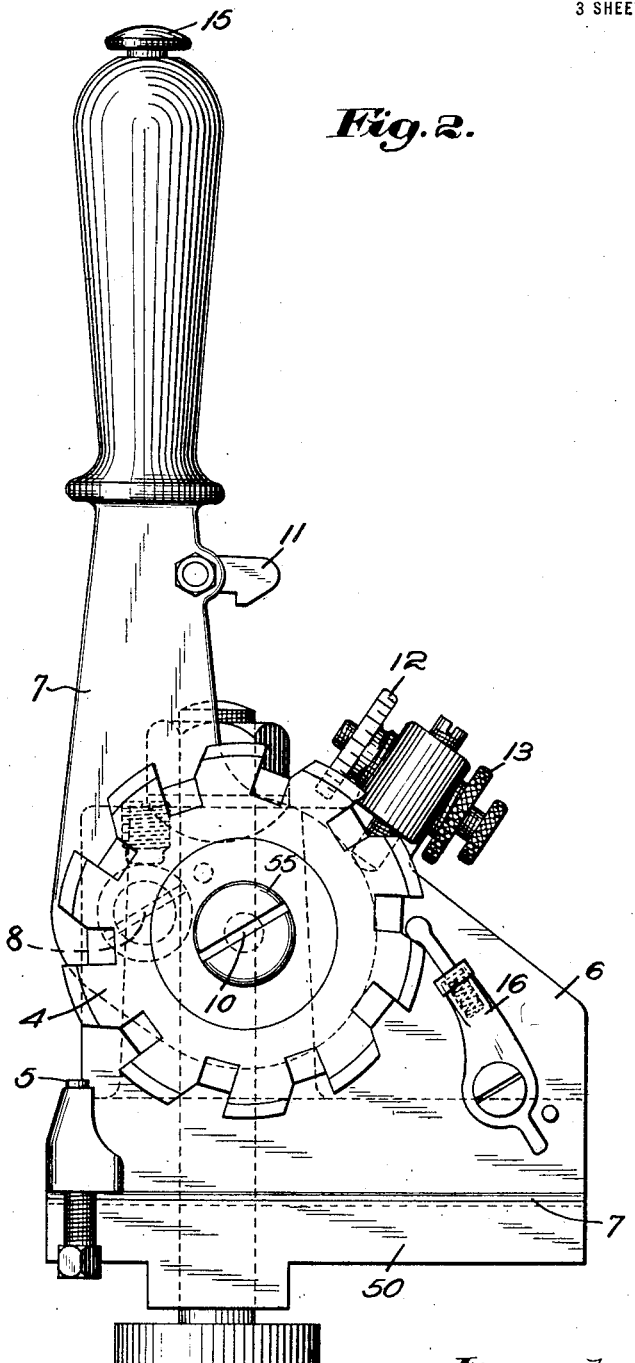

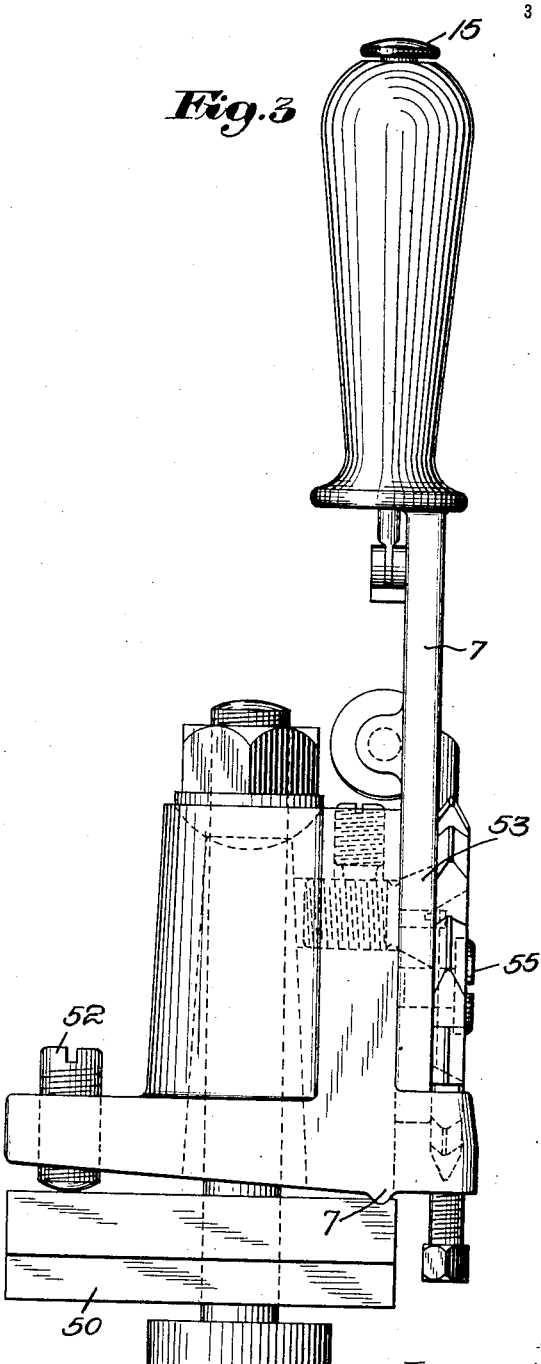

UNITED STATES PATENT OFFICE.

FREDERICK H. HALSTEAD, OF BOSTON, MASSACHUSETTS, ASSIGNOR TO RIVETT LATHE AND GRINDER COMPANY, OF BOSTON, MASSACHUSETTS, A CORPORATION OF MASSACHUSETTS.

LATHE-TOOL.

1,342,746.

Specification of Letters Patent.

Patented June 8, 1920.

Application filed April 7, 1919. Serial No. 288,215.

*To all whom it may concern:*

Be it known that I, FREDERICK H. HALSTEAD, a citizen of the United States, and a resident of Boston, in the county of Suffolk and State of Massachusetts, have invented an Improvement in Lathe-Tools, of which the following description, in connection with the accompanying drawings, is a specification, like characters on the drawings representing like parts.

This invention pertains to improvements in metal working apparatus, and more particularly, though not exclusively, to thread cutting tools and apparatus for presenting such tools to the work. The type of tool to which my invention is particularly applicable is that disclosed in patent to Herman Dock, numbered 632,678, and in patent to Edward Rivett, numbered 652,643, wherein a cutter disk is used which has a plurality of cutting points which increase progressively in length and which are adapted to be progressively presented to the work to cut screw threads and the like. The present invention relates to the same general class of tools as those shown and claimed in my issued Patents Nos. 1,299,710 and 1,299,712, both issued April 8th, 1919.

In the drawings, which show a preferred construction of one illustrative embodiment of my invention:—

Fig. 2 is also a side elevation showing the relative arrangement of the parts at one stage of the cutter rotating operation; and Fig. 3 is an end elevation taken from the left of Fig. 1.

Figure 1:
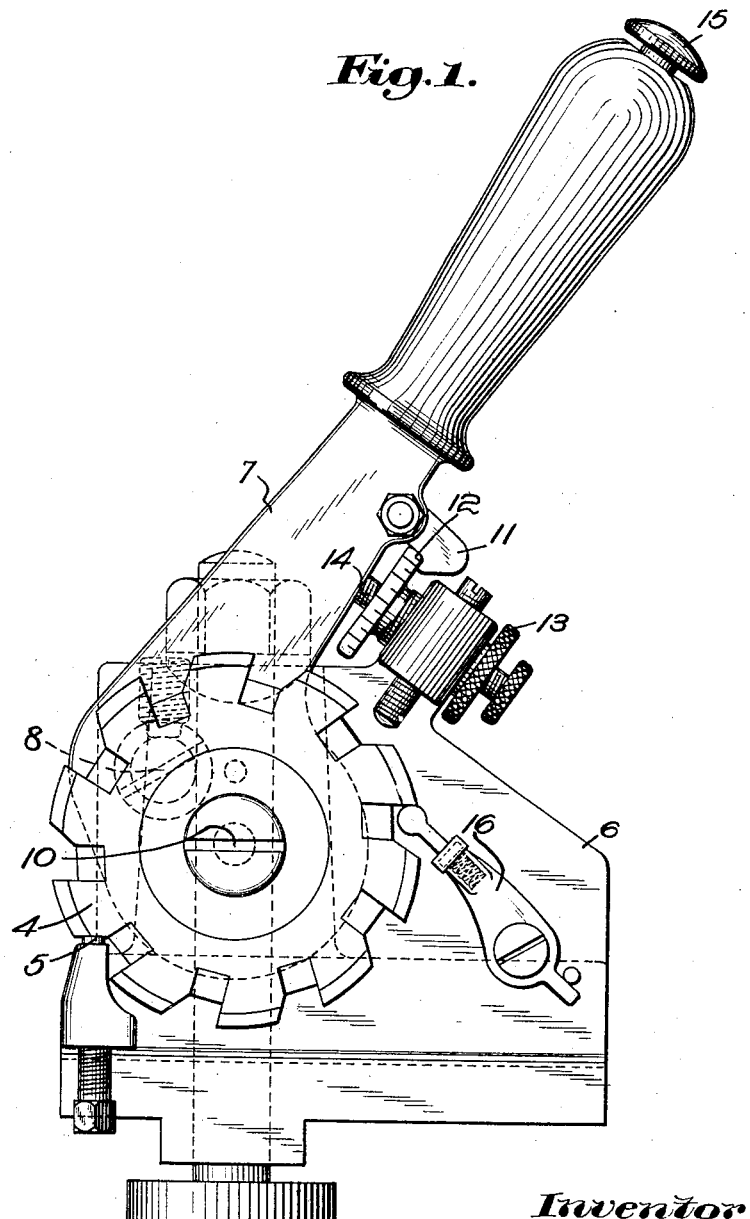
Figure 1 is a side elevation showing the cutter and its improved holder.

The preferred form of my invention shown in the drawings includes a cutter disk 4 having a plurality of cutting points herein shown as ten, progressively increasing in length to cut successive increments of an external thread, coöperating with an improved stock adapted successively to bring said points into cutting position, preferably as shown, while resting on an adjustable cutter point support 5. The preferred form of stock shown in the drawings comprises a frame 6 on which is mounted a lever 7 fulcrumed at 8 and having operatively connected thereto, preferably as shown by being carried on an extension of the lever, a cutter disk bearing centered at 10, eccentric to the center of oscillation 8 of the lever 7. The lever 7 and its extension together may take the form of a bell crank lever, the center 10 preferably being below the axis 8, when the tool is in cutting position. The lever 7 and coöperating parts are preferably so organized as to be away from the work during the cutting operation, as shown in Fig. 1, and to be movable away from the operator and toward the work, as shown in Fig. 2, in the course of the cutter disk turning operation. A latch 11 engaging a latch-engaging part, which may take the form of the disk 12, adjustable by turning the nut 13, may hold the lever in retracted position against an adjustable stop 14 during the cutting operation, thus holding the axis 10 of the cutter disk stationary, while the cutter disk is held against turning about the axis 10 because the cutting tool rests on the support 5 and the work turns clockwise, as viewed in Fig. 1. When it is desired to turn the cutter disk to bring the next cutting point into cutting position, the latch 11 is raised by pressure on the knob 15, and the lever is first rocked from the position shown in Fig. 1 to the position shown in Fig. 2. This movement of the lever moves the cutter disk away from the support 5 so that the disk can turn. During this movement the cutter disk turning pawl 16 drags over the face of the next cutter tooth below it in Fig. 1, and drops into the next notch as shown in Fig. 2. Therefore, as the lever is swung to the right, the pawl 16 engaging the front of the next cutter tooth (now above the pawl) will, as the axis of the cutter disk is moved downwardly, rotate the cutter disk about its axis in a contra-clockwise direction until the parts come to rest in the same general relation shown in Fig. 1 (except for the turning of the cutter disk one-tenth of a revolution).

The frame 6 may be adapted to be mounted in any suitable manner on the tool slide of a lathe. I have shown a base 50 and bolt 51 to perform this function, while a screw 52 may adjust the inclination of the frame relative to the bed to secure any desired angularity of the cutter disk relative to the work. In the preferred construction shown in the drawings, the lever is carried by a screw 53 entering the frame of the stock, the lever being on the same side of the frame as the cutter disk. This provides a very simple, strong, durable and inexpensive construction. The cutter disk may be supported on a tapered bearing 53, which is pinned at 54 to prevent rotation thereof and fastened to the lever by a screw 55.

While I have shown and described a preferred form of one embodiment of my invention, it will be understood that major changes involving omission, substitution, alteration and reversal of parts, and even changes in the mode of operation, may be made without departing from the scope of my invention, which is best defined in the following claims.

Claims:

1. In a tool of the class described, the combination of a rotatable cutter disk providing a plurality of cutting points and a stock therefor including an oscillatory lever, a bearing for the cutter disk having its axis eccentric to and normally below the axis of oscillation of the lever, means for holding the cutter disk rigid during the cutting operation and means for imparting partial rotation to said cutter disk when the lever is oscillated.

2. In a tool of the class described, the combination with a cutter disk of means for imparting step by step rotation thereto, including an oscillatory lever for moving the axis of the cutter disk through the arc of a circle, the axis of oscillation of said lever being above the axis of rotation of said cutter disk, and a pawl operative to impart rotation to said disk in a contra-clockwise direction as viewed from the cutter disk side of the tool.

3. In a tool of the class described, the combination with a cutter disk of means for imparting step by step rotation thereto, including an oscillatory lever for moving the axis of the cutter disk through the arc of a circle, the axis of oscillation of said lever being above the axis of rotation of said cutter disk, and a pawl operative to impart rotation to said disk during each return oscillation of said lever.

4. In a tool of the class described, the combination of a cutter disk, means for imparting step by step rotation thereto including an oscillatory lever for moving the axis of the cutter disk through the arc of a circle, the axis of oscillation of said lever being normally above the axis of rotation of said cutter disk, a pawl carried by a portion of the tool independent of the lever for imparting uni-directional partial rotation to said cutter disk during each return oscillation of said lever.

5. In a tool of the class described, the combination of a cutter disk and means for imparting step by step rotation thereto including an oscillatory lever for moving the axis of the cutter disk through the arc of a circle and a coöperating pawl operative to impart uni-directional partial rotation to said disk during each return oscillation of said lever, said pawl including resilient means for permitting variation in the effective length thereof.

In testimony whereof I have signed my name to this specification.

FREDERICK H. HALSTEAD.